(12) United States Patent
Chanda et al.

(10) Patent No.: US 12,512,853 B2
(45) Date of Patent: Dec. 30, 2025

(54) DATA COMPRESSION IN A DATA TRANSFORM ACCELERATOR

(71) Applicant: MaxLinear, Inc., Carlsbad, CA (US)

(72) Inventors: Pinaki Shankar Chanda, San Diego, CA (US); Michael Ray Ham, San Jose, CA (US)

(73) Assignee: MaxLinear, Inc., Carlsbad, CA (US)

( * ) Notice: Subject to any disclaimer, the term of this patent is extended or adjusted under 35 U.S.C. 154(b) by 121 days.

(21) Appl. No.: 18/596,549

(22) Filed: Mar. 5, 2024

(65) Prior Publication Data

US 2025/0023579 A1    Jan. 16, 2025

Related U.S. Application Data

(60) Provisional application No. 63/513,413, filed on Jul. 13, 2023.

(51) Int. Cl.
*H03M 7/30* (2006.01)
*G06F 3/06* (2006.01)

(52) U.S. Cl.
CPC ........ *H03M 7/3088* (2013.01); *G06F 3/0608* (2013.01); *G06F 3/0659* (2013.01); *G06F 3/0679* (2013.01); *G06F 3/0638* (2013.01)

(58) Field of Classification Search
CPC .. H03M 7/3088; G06F 3/0608; G06F 3/0659; G06F 3/0679; G06F 3/0638
See application file for complete search history.

(56) References Cited

U.S. PATENT DOCUMENTS 4,558,302 A    12/1985    Welch
10,412,002 B1 *    9/2019    Richardson ............ H04L 45/74

OTHER PUBLICATIONS

"LZ4", GitHub, Retrieved from: https://github.com/lz4/lz4 on Mar. 4, 2024, 8 pgs.
"Project-Zipline" opencomputeproject, GitHub, Retrieved from: https://github.com/opencomputeproject/Project-Zipline on Feb. 17, 2024, 5 pgs.
Alakuijala et al., "Brotli Compressed Data Format", RFC Editor, Request for Comments: 7932, Jul. 2016, 128 pgs.
Burrows et al., "A Block sorting Lossless Data Compression Algorithm", SRC Research Report 124, May 10, 1994, 24 pgs.
Cleary et al., "Data Compression Using Adaptive Coding and Partial String Matching", IEEE Transactions on Communications, vol. 32, No. 4, Apr. 1984, pp. 396-402.

(Continued)

*Primary Examiner* — Joseph J Lauture
(74) *Attorney, Agent, or Firm* — Buchalter; Jason W. Croft

(57) ABSTRACT

A method includes obtaining, by a data transform accelerator, a first command and first source data associated with the first command. The method also includes generating, by the data transform accelerator, one or more containers using the first command. Each of the one or more containers may have a container size and may be operable to store compressed source data. The method further includes obtaining a mode of operation for a data compression operation. The method also includes performing the data compression operation to a first portion of the first source data using the mode of operation to obtain the compressed source data. The method further includes storing the compressed source data in a first container of the one or more containers.

20 Claims, 4 Drawing Sheets

(56) References Cited

OTHER PUBLICATIONS

Deutsch, "DEFLATE Compressed Data Format Specification version 1.3", RFC Editor, Request for Comments: 1951, May 1996, 17 pgs.
Deutsch, "GZIP File Format Specification version 4.3", RFC Editor, Request for Comments: 1952, May 1996, 12 pgs.
Deutsch et al., "ZLIB Compressed Data Format Specification version 3.3", RFC Editor, Request for Comments: 1950, May 1996, 10 pgs.
Collet, "zstd" GitHub, Feb. 2, 2017, Retrieved from: https://github.com/facebook/zstd/wiki on Feb. 8, 2024, 4 pgs.
Schneider et al., "PPP LZS-DCP Compression Protocol (LZS-DCP)" RFC Editor, Request for Comments: 1967, Aug. 1996, 18 pgs.
Seward, "bzip2 and libbzip2, version 1.0.8: A program and library for data compression", SourceWare, Version 1.0.8 of Jul. 13, 2019, 38 pgs.
Ziv et al., "A Universal Algorithm for Sequential Data Compression", IEEE Transactions on Information Theory, vol. 23, No. 3, May 1977, pp. 337-343.
Ziv et al., "Compression of Individual Sequences via Variable-Length Coding", IEEE Transactions on Information Theory, vol. 24, No. 5, Sep. 1978, pp. 530-536.

* cited by examiner

DATA COMPRESSION IN A DATA TRANSFORM ACCELERATOR

CROSS REFERENCE TO RELATED APPLICATIONS

This U.S. Patent Application claims priority to U.S. Provisional Patent Application No. 63/513,413, titled "DATA COMPRESSION IN A DATA TRANSFORM ACCELERATOR," and filed on Jul. 13, 2023, the disclosure of which is hereby incorporated by reference in its entirety.

TECHNICAL FIELD

This disclosure generally relates to data transform acceleration, and more specifically, to data compression in a data transform accelerator.

BACKGROUND

Unless otherwise indicated herein, the materials described herein are not prior art to the claims in the present application and are not admitted to be prior art by inclusion in this section.

Data transform accelerators are co-processor devices that are used to accelerate data transform operations for various applications such as data analytics applications, big data applications, storage applications, cryptographic applications, and networking applications. For example, a data transform accelerator can be configured as a storage accelerator and/or a cryptographic accelerator.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

In an example embodiment, a method may include obtaining, by a data transform accelerator, a first command and first source data associated with the first command. The method also includes generating, by the data transform accelerator, one or more containers using the first command. Each of the one or more containers may have a container size and may be operable to store compressed source data. The method further includes obtaining a mode of operation for a data compression operation. The method also includes performing the data compression operation to a first portion of the first source data using the mode of operation to obtain the compressed source data. The method further includes storing the compressed source data in a first container of the one or more containers.

The objects and advantages of the embodiments will be realized and achieved at least by the elements, features, and combinations particularly pointed out in the claims.

Both the foregoing general description and the following detailed description are given as examples and are explanatory and not restrictive of the invention, as claimed.

DESCRIPTION OF DRAWINGS

Example implementations will be described and explained with additional specificity and detail using the accompanying drawings in which.

DETAILED DESCRIPTION

Figure 1:
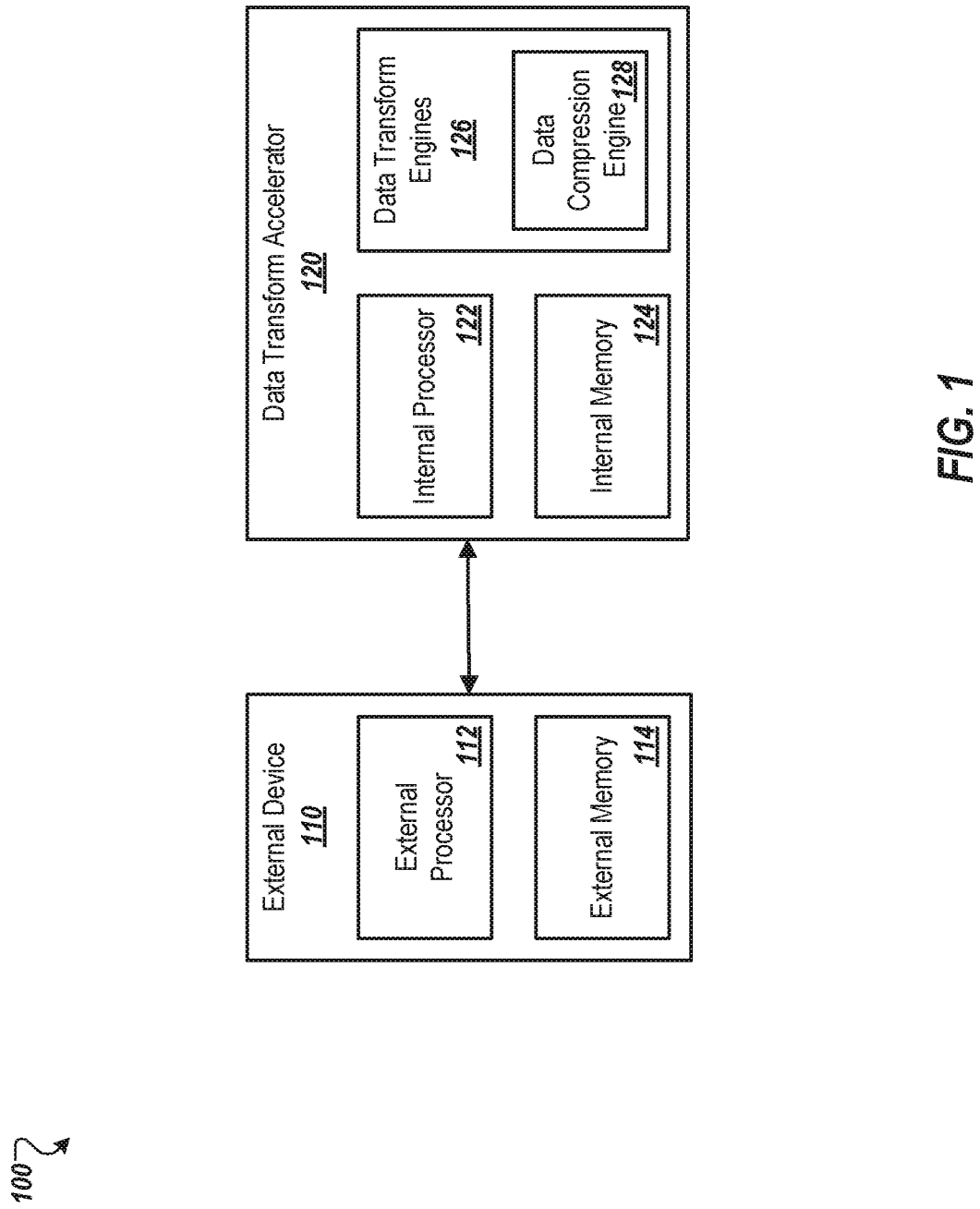
FIG. 1 illustrates a block diagram of an example environment for data compression in a data transform accelerator.

A data transform accelerator may be used as a coprocessor device in conjunction with a host device to accelerate data transform operations for various applications, such as data analytics, big data, storage, and/or networking applications. The data transform operations may include, but not be limited to, compression, decompression, encryption, decryption, authentication tag generation, authentication, data deduplication, non-volatile memory express (NVMe) protection information (PI) generation, NVMe PI verification, and/or real-time verification.

Many file systems and/or storage systems use block-like structures, like a physical disk organized into blocks and/or sectors. Data in the file systems may be managed in units of blocks (e.g., typically block sizes may be 1 KB, 2 KB, 4 KB, and/or 16 KB) and the block size may be determined during an initialization of the file system. Sometimes, programs utilizing the file systems may use the determined block sizes and/or may perform storage operations on raw sectors and/or blocks of the storage systems. In such instances, performance degradation may occur as storage in the file systems may not be performed in the unit of blocks defined in the file system or in the storage system.

Alternatively, or additionally, erasing stored data and/or rewriting new data may be performed by some programs, which may or may not be performed in the unit of blocks defined in the file system. In such instances, storage of the data in the file systems may become increasingly fragmented where different sized blocks may be used in various operations. For example, in instances in which a first block is written, later erased, and replaced with a new block and each of the aforementioned blocks have different sizes, the heap used for memory management may be fragmented and/or may experience reduced performance.

At least some aspects of the present disclosure address these and other shortcomings by determining and generating uniform container sizes to store compressed source data. As source data is compressed, the compressed source data may be stored in the uniform-sized containers, such that all blocks in the file system (as described above) are the same size. As such, memory usage may be improved as memory fragmentation may be reduced, loading times from memory may be increased, indexing of the file system may be improved, and/or performance tuning of the file system may be accomplished.

Data transform operations performed by the data transform accelerator may be separated based on a direction associated with the data, such as an encode direction (associated with transmitting and/or encoding data) and a decode direction (associated with receiving and/or decoding encoded data). For example, encode direction data transform operations may include NVMe PI verification on input data, compression, deduplication hash generation, padding, encryption, cryptographic hash generation, and NVMe PI generation on encoded data, real-time verification on the encoded data, and/or a combination of one or more of the preceding encode direction data transform operations. In another example, decode direction data transform operations may include decryption (e.g., with or without cryptographic hash for authentication), depadding, decompression, hash generation for data verification, NVMe PI verification on decoded data, and/or a combination of one or more of the preceding decode direction data transform operations.

The data transform accelerator may include various data transform engines that may be configured in a pipeline to perform the various data transform operations, in either the encode direction or the decode direction. For example, a first pipeline may include a first arrangement of the data transform engines and may be operable to perform the encode direction data transform operations. In another example, a second pipeline may include a second arrangement of the data transform engines and may be operable to perform the decode direction data transform operations.

In some circumstances, data transform operations performed in the encode direction (e.g., by data transform engines included in a first pipeline) may generate metadata and/or other outputs that may be utilized by a second pipeline and/or associated data transform engines configured to perform data transform operations in the decode direction. For example, according to some aspects of the present disclosure, at least some output(s) from the encode direction data transform operations may generate metadata that may be used in a decode direction pipeline that may facilitate data transform operations performed in the decode direction pipeline. In such instances, the data transform operations performed in the decode direction (e.g., data transform operations performed by the data transform engines in a pipeline in the decode direction) may reduce latency of data transform operations in the decode direction and/or may increase throughput of the data transform operations in the decode direction.

FIG. 1 illustrates a block diagram of an example environment 100 for data compression in a data transform accelerator 120, in accordance with at least one embodiment of the present disclosure. The environment 100 may include an external device 110 and the data transform accelerator 120. The external device 110 may include an external processor 112 and an external memory 114. The data transform accelerator 120 may include an internal processor 122, an internal memory 124, and data transform engines 126. The data transform engines 126 may include at least a data compression engine 128.

In some embodiments, the external device 110 (e.g., a host computer, a host server, etc.) may be in communication with the data transform accelerator 120 via a data communication interface (e.g., a Peripheral Component Interconnect express (PCIe) interface, a Universal Serial Bus (USB) interface, and/or other similar data communication interfaces). In some embodiments, upon a request by a user to transform source data that may be located in the external memory 114, software (e.g., a software driver) on the external device 110 and operated by the external processor 112 may be directed to generate metadata (such as, but not limited to, data transform command pre-data including a command description, a list of descriptors dereferencing a different section of the metadata, and a list of descriptors dereferencing source data and destination data buffers, command pre-data including transform algorithms and associated parameters, source and action tokens describing different sections of the source data and transform operations to be applied to different sections, and/or additional command metadata) with respect to transforming the source data in the external memory 114. In some embodiments, the software may generate the metadata in the external memory 114 based on the source data that may be obtained from one or more sources. For example, the source data may be obtained from a storage associated with the external device 110 (e.g., a storage device), a buffer associated with the external device 110, a data stream from another device, etc. In these and other embodiments, obtaining the source data may include copying or moving the source data to the external memory 114.

In some embodiments, the software may direct the external processor 112 to generate the metadata associated with the source data. In some embodiments, the metadata may be stored in one or more input buffers. For example, in instances in which the metadata includes a data transform command that may contain a list of source descriptors, destination descriptors, command pre-data, source and action tokens, and additional command metadata, each of the individual components of the metadata may be stored in individual input buffers (e.g., the data transform command in a first input buffer, pre-data in the second input buffer, the source and action tokens in the third input buffer, and so forth). In some embodiments, the input buffers associated with the metadata may be located in the external memory 114. Alternatively, or additionally, the input buffers associated with the metadata may be located in the internal memory 124. Alternatively, or additionally, the input buffers may be located in both the external memory 114 and the internal memory 124. For example, one or more input buffers associated with the metadata may be located in the external memory 114 and one or more input buffers associated with the metadata may be located in the internal memory 124. In these and other embodiments, the external processor 112 may direct the software to reserve one or more output buffers that may be used to store an output from the data transform accelerator 120. In some embodiments, the output buffers may be located in the external memory 114. In some embodiments, the output buffers may be located in the internal memory 124 of the data transform accelerator 120.

In instances in which the software directs the external processor 112 to generate the metadata and store the metadata in the internal memory 124 (e.g., in the input buffers located in the internal memory 124) and/or in the external memory 114, the external processor 112 may transmit commands to the data transform accelerator 120 (e.g., such as to a component of the data transform accelerator 120, such as the internal processor 122) via the data communication interface. For example, the internal memory 124 may be accessible and/or addressable by the external processor 112 via the data communication interface, and, in instances in which the data communication interface is PCIe, the internal memory 124 may be mapped to an address space of the external device 110 using a base address register associated with an endpoint of the PCIe (e.g., the data transform accelerator 120).

In some embodiments, the software may direct the data transform accelerator 120 to process a data transform command. For example, the software may direct the data transform accelerator 120 to obtain an address that may point to the data transform command. In some embodiments, the data transform command may be used by the data transform accelerator 120 to transform the source data based on data transform operations included in the data transform command. In some embodiments, the data transform operations that may be performed as directed by the data transform command may be performed by the data transform engines 126. In some embodiments, the data transform engines 126 may be arranged according to the data transform command and/or the metadata (e.g., the metadata stored in the external memory 114 and/or stored in the internal memory 124), such that the data transform engines 126 form a data transform pipeline that may be configured to perform the data transform operations to the source data.

In some embodiments, the address and/or the data transform command may be located in the external memory 114. In such instances, the data transform accelerator 120 (e.g., the internal processor 122 and/or the data transform engines 126) may obtain the address and/or may access the data transform command in the external memory 114 using the data communication interface. Alternatively, or additionally, the address and/or the data transform command may be located in the internal memory 124, and the address may be obtained by the internal processor 122 and/or the data transform engines 126.

In these and other embodiments, external device 110 may use the data communication interface to transmit metadata to the data transform accelerator 120, which the internal processor 122 may direct to be stored in the internal memory 124 and the internal processor 122 may return the address of the stored metadata to the external processor 112. Alternatively, or additionally, the external device 110 may use the data communication interface to transmit metadata directly to the internal memory 124 of the data transform accelerator 120.

In some embodiments, data transform operations performed by the data transform engines 126 (e.g., one or more data transform operations performed in the data transform pipeline, as described herein) may produce second metadata that may be used to configure a second pipeline in the data transform accelerator 120, as described herein.

The data transform accelerator 120 may be operable to perform data transform operations using one or more pipelines, the pipelines including a configuration of the data transform engines 126. The pipelines in the data transform accelerator 120 may be described as performing data transform operations in at least two directions, an encode direction and/or a decode direction. The encode direction data transform operations performed by a first pipeline in the data transform accelerator 120 may include one or more of NVMe PI verification on input data, compression, deduplication hash generation, padding, encryption, cryptographic hash generation, and NVMe PI generation on encoded data, and/or real-time verification on the encoded data. The decode direction data transform operations performed by a second pipeline in the data transform accelerator 120 may include one or more of decryption (e.g., with or without verification generated on the input data and/or the transformed data), depadding, decompression, deduplication hash generation on input data and/or transformed data (e.g., obtained from the input data), and/or NVMe PI verification on the encoded data.

In some embodiments, the data transform accelerator 120 may be operable to support multiple data transform sessions, where a data transform session may include source data, associated metadata, and the data transform engines 126 (e.g., arranged in a data transform pipeline), as described herein. In some embodiments, one or more data transform commands may include the same or similar algorithms in the data transform operations. In such instances, the individual data transform commands may be grouped together into a data transform session. In some embodiments, the multiple data transform commands grouped into a data transform session may include the same or similar metadata. In such instances, the data transform accelerator 120 may store the source data and/or the metadata in the internal memory 124, as described herein, and the data transform accelerator 120 may provide the address to external device 110, such that the external device 110 may include the addresses within the data transform commands belonging to the session.

In these and other embodiments, one or more source descriptors may be included in the multiple data transform commands that may point to one or more input buffers that may be configured to store the metadata shared across multiple commands in a session. Alternatively, or additionally, the multiple data transform commands may include one or more source descriptors that may point one or more input buffers that may be configured to store the source data and/or the metadata that may be unique to different commands of the session. In instances in which a first data transform command and a second data transform command have the same input data and/or metadata, the corresponding source descriptors may point to the same input buffer(s). In instances in which the first data transform command and the second data transform command have different input data and/or metadata, the corresponding source descriptors may point to different input buffers, as applicable.

For example, a first data transform session may include a first data transform command that may include first source data in a first input buffer and associated first metadata stored in a second input buffer of the internal memory 124, and one or more data transform engines 126 may be arranged in a first data transform pipeline. The first data transform session may include a second data transform command that may include the first source data (stored in the first input buffer) and the first metadata. Alternatively, or additionally, the second data transform command may utilize the shared source data and/or shared metadata to perform the data transform operations. In the examples, the first data transform command and the second data transform command may include the same source descriptors as the first data transform command and the second data transform command may use the same source data and/or metadata stored in respective input buffers.

The data transform accelerator 120 and/or the components included therein (e.g., the internal processor 122, the internal memory 124, and/or the data transform engines 126) may be implemented using various systems and/or devices. For example, the data transform accelerator 120 may be implemented in hardware, software, firmware, a field-programmable gate array (FPGA), a graphics processing unit (GPU), and/or a combination of any of the above listed implementations.

The data compression engine 128 may be operable to perform data compression operations in the data transform accelerator 120. The data compression operations may include one or more data compression algorithms, all of which may be performed by the data compression engine 128 of the data transform accelerator 120. For example, the data compression algorithms may include, but not limited to, a substring search algorithm (which may be included in the data compression engine 128 and/or an external device), a dictionary-based matching algorithm that may replace substrings found in the source data as tokens for additional compression, a lossless coding algorithm that may encode substrings of the source data and/or of matching dictionary entries for the substrings in the source data, a prediction by partial matching algorithm, and/or other data compression algorithms.

In instances in which a dictionary-based algorithm is used, the dictionary may be a static pre-initialized dictionary and/or an adaptive dictionary (e.g., the dictionary may be constructed and/or revised as part of the data compression operations) that may utilize a history buffer that may be included in the data transform accelerator 120. Some example data compression algorithms may include, but not be limited to, LZ77, LZ78, LZ4, LZS, Deflate, GZIP, ZLIB, XP10, Zstandard, Brotli, Huffman code, Asymmetric Numeral System (ANS), Burrows-Wheeler transform, and/or other data compression algorithms.

The aforementioned data compression algorithms may include one or more dictionaries, context-based models, codebooks, and/or initial parameters, which may be associated with the data compression algorithm employed by the data compression engine 128. In the present disclosure, reference to a "dictionary" may refer to a dictionary, a context-based model, a codebook, and/or initial parameters, unless otherwise specifically noted, as the aforementioned may be associated with different data compression algorithms that may be implemented by the data compression engine 128.

In some embodiments, the data compression engine 128 may obtain source data to compress and store in one or more containers. In some embodiments, the data transform accelerator 120 may obtain the source data, such as from the external device 110. The source data may be stored in the external memory 114 and/or the internal memory 124. In some instances, the source data may be processed by one or more of the data transform engines 126 prior to the data compression engine 128. Alternatively, or additionally, the output of the data compression engine 128 (e.g., a container storing compressed source data, as described herein) may undergo additional data transform operations by the data transform engines 126 and/or may be stored or transmitted by the data transform accelerator 120 until the compressed source data stored in the containers may be decompressed to obtain the source data. In these and other embodiments, the data transform accelerator 120 may be operable to generate the containers using a command, as described herein.

In some embodiments, the data compression engine 128 may perform data compression operations in view of subsequent data transform operations that may be performed relative to the containers storing the compressed source data. For example, the data compression engine 128 may reserve a portion of a container (e.g., the compressed source data may fill a first portion of the container and a second portion of the container may be reserved) for NVMe PI insertion, padding, encryption (e.g., with or without authentication), dictionaries, and/or metadata, which may be performed subsequently by one or more additional data transform engines of the data transform engines 126, as further described relative to FIG. 2.

In some embodiments, the data transform accelerator 120 and/or the data compression engine 128 may be operable to tune one or more data compression parameters of the data compression algorithm. The data compression parameters may be tunable in view of various objectives provided to the data transform accelerator 120 and/or the data compression engine 128. For example, the data compression parameters of the data compression algorithm may be tuned in view of maximizing compression of the source data, where portions of the source data may compress to a smaller size than a container size, and padding may be added to the container such that the container is substantially full (e.g., a combination of the compressed source data and the padding may occupy the space provided by the container). In another example, the data compression parameters of the data compression algorithm may be tuned to optimize the size of the compressed source data relative to the container size of the container (e.g., without attempting to improve and/or maximize the data compression efficiency, rather to fit the compressed source data to the container size).

In some embodiments, adjustments to the data compression parameters of the data compression algorithm may be performed in response to an input (e.g., a user input) or in response to results from other data compression operations. For example, in instances in which a first data compression of first source data performed by the data compression engine 128 is larger than a container is able to store (e.g., overflow), the data compression engine 128 and/or the data transform accelerator 120 may use the results to tune the data compression parameters of the data compression algorithm, such that a subsequent second data compression of second source data may be stored in a container (e.g., without overflow). In such instances, the data compression engine 128 and/or the data transform accelerator 120 may account for the overflowed portion of compressed source data from the first container to be included in the second container. For example, the data compression engine 128 and/or the data transform accelerator 120 may direct the overflowed portion of the first compressed source data to be included in the second container and the amount of second source data may be respectively decreased, such that the overflowed portion of the first compressed source data and a second compressed source data may be stored in the second container.

The data compression engine 128 may perform operations using a determined mode of operation. The mode of operation may be either stateless data compression operations and/or stateful data compression operations. For example, in stateless data compression operations, the compressed source data stored in each container (as described herein) may be decompressed independent of the compressed source data stored in any other containers. In another example, in stateful data compression operations, compressed source data stored in at least some of the containers may include dependencies on compressed source data stored in one or more preceding containers during decompression operations.

In instances in which the data compression engine 128 uses stateless data compression, the dictionary (e.g., a static, pre-initialized dictionary) used in the data compression operation may be initialized for each container, such that the compressed source data in each container may be independent from compressed source data in another container. As such, data compression operations performed by the data compression engine 128 using stateless data compression may cause the compressed source data stored in the containers to be independent, which may facilitate more efficient data decompression operations at a later time, as described herein.

In instances in which the data compression engine 128 uses stateful data compression, one or more containers (e.g., holding the compressed source data) may include dependencies in subsequent containers. For example, a first container may not include any dependencies (e.g., the dictionary may be initialized with the first container), a second container may include a dependency on the first container (e.g., the dictionary may be updated during the compression of the source data into the first container), a third container may include a dependency on the second container (and by extension, a dependency on the first container), and so forth. In such instances, the dependencies may be manifest during data decompression operations. For example, in instances in which the second container described above is to be decompressed, the first container may first be decompressed and then the second container may be decompressed.

In instances in which dependencies exist between at least a first container and a second container (e.g., stateful data compression), an output from the data compression engine 128 associated with the first container may include a frame header, which may include one or more compression parameters associated with the first container (the compression parameters being associated with the data compression operation on the source data stored in the first container) and where the frame header may be utilized by subsequent containers for decompression. For example, in instances in which the second container (dependent on the first container) is to be decompressed, the first frame header may be used to first decompress the first container, then the second container may be decompressed. Each container that includes a subsequent dependent container may include a frame header that may be used for future decompression.

Alternatively, or additionally, subsequent containers (e.g., any container included in stateful data compression that includes a dependency (e.g., not the first container)) may include a checksum associated therewith. The checksum may be used to verify a continuity of the source data compressed in the containers.

In these and other embodiments, a number of containers that may include dependencies (e.g., a number of containers in a set) may be defined, such as by the data transform accelerator 120 and/or the external device 110 (e.g., the software on the external device 110 and/or the external processor 112). Alternatively, or additionally, the number of containers that may be included in a set may be based on a user input into the external device 110 and/or the data transform accelerator 120. For example, a first set of three containers may include first dependencies between one another (as described), a second set of three containers may include second dependencies between one another, and so forth, where the number of containers included in a set (e.g., three) may be predetermined or defined by user input. The above example includes a set size of three, which is exemplary only. Any other number of containers may be included in a set (which may include one, which may be the stateless data compression).

In some embodiments, the number of containers included in a set may introduce a tradeoff between the compression of the source data therein and the complexity of decompressing the source data in the containers. For example, using stateless data compression (e.g., each container is independent of other containers), the source data in each container may be decompressed independently, at the expense of a less efficient compression (e.g., as the dictionary may be static and/or may not update based on data compression operations performed on other source data associated with other containers. In another example, using stateful data compression where the number of containers in a particular set is set to a larger value (e.g., such as five or more), the source data compressed into each subsequent container of the set may experience increasing efficiency in the compression (e.g., as the dictionary updates, the data compression operation may improve) at the expense of dependencies between the containers in the particular set.

The one or more containers operable to store the compressed source data may include a fixed size. In instances in which the containers include a fixed size, the containers may provide more efficient storage (e.g., less wasted storage due to fragmentation), faster loading times (relative to non-uniform sized containers), better indexing, and/or performance tuning of memory systems. The fixed size of the containers may be determined based on one or more considerations including: operating system associated with the containers and/or the data transform accelerator 120; software associated with the external device 110 the external processor 112, the data transform accelerator 120, and/or the internal processor 122; a storage architecture associated with the external memory 114 and/or the internal memory 124; performance tuning of the data transform accelerator 120, the data compression engine 128, and/or the storage operations of the external memory 114 and/or the internal memory 124; and/or a user input associated with an estimate of an amount of compression of the source data (e.g., which may direct the number of containers per command). In these and other embodiments, the fixed size of the containers may be determined by the external device 110 and/or the data transform accelerator 120 and the metadata associated with the command may direct the data compression engine 128 of the fixed size of the containers.

In some embodiments, the fixed size containers may facilitate improved memory storage operations as all containers storing compressed source data may be uniformly sized, such that the containers may be easily organized (e.g., placement in memory is simplified where all blocks are the same size), rewriting and/or replacement of containers may be simplified (e.g., as a container is removed, a replacement can simply fill the created gap as the replacement container may be substantially the same size as the removed container). An example of compressing source data into one or more containers is further illustrated and discusses relative to FIG. 2.

In some embodiments, the fixed size of the containers may be a power of two, as may be commonly used in storage devices. Alternatively, or additionally, the fixed size of the containers may be any size, not limited to a power of two. For example, the fixed size of the container may initially be a power of two, and then may include an additional amount of space, such as to accommodate subsequent data transform operations, such as NVMe PI insertion as described herein. In these and other embodiments, the fixed size of the container may be any size that may be supported by the data transform accelerator 120 and/or the storage device operable to store the containers.

In these and other embodiments, the source data obtained by the data compression engine 128 (e.g., via the data transform accelerator 120) may be submitted to the data transform accelerator 120 in a command. The command may include at least source descriptors (pointing to a location of the source data), destination descriptors (pointing to a location where the containers may be output), a data compression algorithm to use in the data compression operations in the data compression engine 128, the dictionary associated with the data compression algorithm to be utilized by the data compression engine 128, and/or other metadata associated with the source data to be used by the data transform accelerator 120 and/or the data compression engine 128. In some embodiments, the stateful data compression operations may include sharing the dictionaries between the commands.

At the conclusion of a data compression operation by the data compression engine 128 associated with a command, the data compression engine 128 may be operable to generate a report associated with the data compression operation. The report may include a consumed byte count of the source data during the data compression operation. Alternatively, or additionally, the report may include a compressed data size of the compressed source data during the data compression operation. In these and other embodiments, the data transform accelerator 120 may be operable obtain the report from the data compression engine 128 and/or transmit the report to a device associated with the source data, such as the external device 110. As such, the external device 110 may be operable to determine additional data compression operations (e.g., when a portion of the source data may not have been compressed) and/or may maintain an index of the compressed source data for retrieval and decompression at another time.

In instances in which multiple commands include similar a data compression algorithm, the multiple commands may be grouped into a session and the grouped commands may share one or more session parameters. For example, grouped commands in a session may share the same data compression algorithm, initial data, dictionary, and/or encryption keys and/or values, etc.

In some embodiments, the grouped commands in a session may include a substantially similar command structure. Alternatively, the first command and/or the last command of the grouped commands may include some differences with other commands in the session, which differences may be attributed to established data compression operations, completing data compression operations, and/or returning the results associated with the data compression operations (e.g., as may be utilized in stateful data compression operations).

In some embodiments, a session may be operable to support hybrid data compression, which may include a combination of stateful data compression and stateless data compression. For example, some dictionaries may be shared between the grouped commands included in the session and some other components may not be shared. For example, some dictionaries (e.g., a static pre-initialized dictionary and/or a Huffman codebook) associated with a first command may be shared with a second command (e.g., the first command and the second command included in a particular session), and a history buffer (e.g., for the LZ77 data compression algorithm) may be initialized for each command in the particular session.

In some embodiments, one or more sessions may be used in different scopes. Each of the one or more sessions may belong to a set of sessions that may be associated with a particular scope. For example, a first session set may be used to track data transform operation grouping commands that may be based on data transform operation types. A second session set may be used to share the states for data compression operations.

In some embodiments, a mapping between two or more scopes may be generated, such as by the data transform accelerator 120 and/or the data compression engine 128. For example, the first session set may include one or more of the second session set. In another example, in instances in which multiple first session sets include the same or similar data compression algorithms and share state of compression operations between each other, may share a second session set. In some embodiments, there may be a one-to-one mapping between the first session set and the second session set.

Modifications, additions, or omissions may be made to the environment 100 without departing from the scope of the present disclosure. For example, the designations of different elements in the manner described herein is meant to help explain concepts described herein and is not limiting. Further, the environment 100 may include any number of other elements or may be implemented within other systems or contexts than those described. For example, any of the components of FIG. 1 may be divided into additional or combined into fewer components.

Figure 2A:
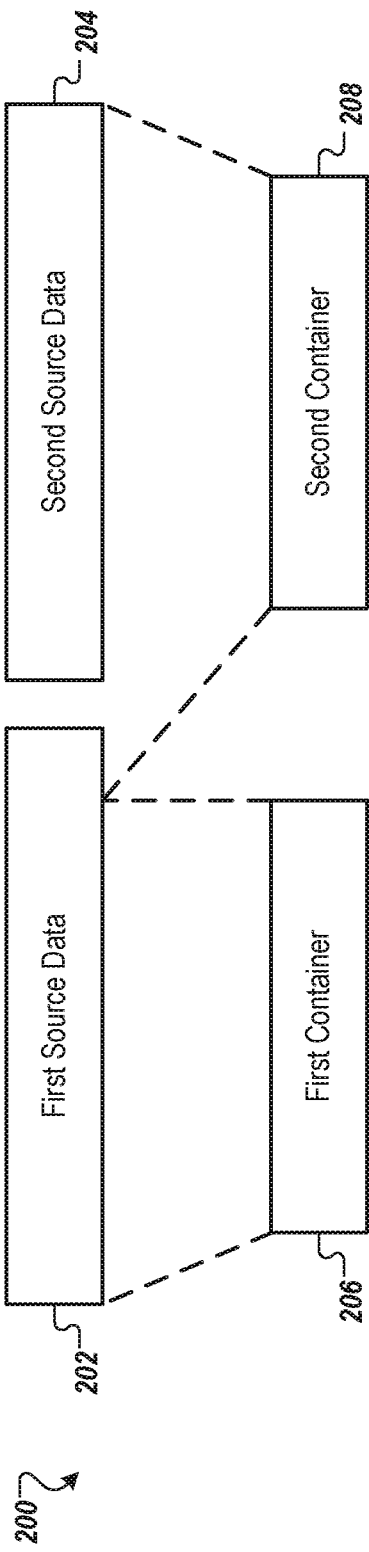
FIG. 2A illustrates an example compression operation in a data transform accelerator.
Figure 2B:
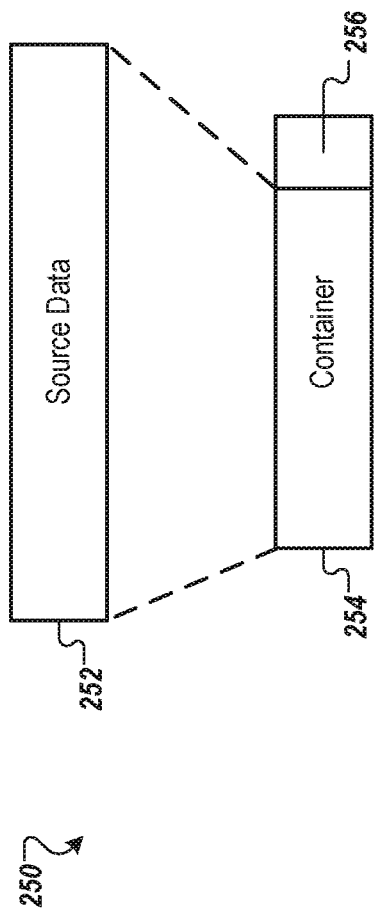
FIG. 2B illustrates an example compression operation in a data transform accelerator.

FIGS. 2A and 2B illustrate an example compression operation 200 and compression operation 250, respectively, in a data transform accelerator, in accordance with at least one embodiment of the present disclosure. The compression operation 200 may include first source data 202, second source data 204, a first container 206, and a second container 208. The compression operation 250 may include first source data 252, a container 254, and a reserved portion 256.

As illustrated in FIG. 2A, a compression engine (e.g., the data compression engine 128 of FIG. 1) may be operable to compress at least a portion of source data for storage in a container. For example, a portion of the first source data 202 may be compressed and stored in the first container 206. In some instances, a portion of the first source data 202 may not be able to be stored in the first container 206 after compression (e.g., the first source data 202 compressed by a smaller amount than anticipated). In such instances, the portion of the first source data 202 that was not stored in the first container 206 may be returned by the data transform accelerator and may be included with the second source data 204 to be compressed and stored in the second container 208, as illustrated.

For example, in view of the components of FIG. 1, the data compression engine 128 may compress a portion of the first source data 202 and store the compressed first source data in the first container 206. The data compression engine 128 may return the uncompressed portion of the first source data 202 (e.g., to the location where the first source data 202 was transmitted from, such as the internal memory 124 or the external memory 114) to subsequently be combined with the second source data 204. The combination of the uncompressed portion of the first source data 202 and the second source data 204 may be compressed by the data compression engine 128 and stored in the second container 208.

In these and other embodiments, the size of the first container 206 and the size of the second container 208 may be uniform, as determined by an amount of compressed data that may be stored in the first container 206 and the second container 208. For example, as illustrated, a first amount of source data compressed and stored in the first container 206 (e.g., a portion of the first source data 202) appears to be larger than a second amount of source data compressed and stored in the second container 208 (e.g., a portion of the first source data 202 and the second source data 204). As compressed, the first amount of source data and the second amount of source data may be substantially uniform, as the first amount of source data and the second amount of source data are stored in the first container 206 and the second container 208, respectively, where the first container 206 and the second container 208 may be substantially uniform in size.

Referring now to FIG. 2B, in some embodiments, a portion of the container 254 may include the reserved portion 256. The reserved portion 256 may be designated by the compression engine (e.g., the data compression engine 128 of FIG. 1) and/or the data transform accelerator (e.g., the data transform accelerator 120 of FIG. 1). In some instances, the reserved portion 256 may be reserved in view of subsequent data transform operations to be performed by the data transform accelerator (e.g., data transform operations following the data compression operation). For example, in some embodiments, the data transform accelerator may be operable to perform a padding operation for a subsequent encryption operation, a generation and insertion operation of an authentication tag in the source data and/or in the compressed data, an NVMe PI insertion operation subsequent to the data compression operation, and the data transform accelerator and/or the compression engine may cause a portion of the container 254 to be reserved (e.g., the reserved portion 256) for the data generation in the subsequent padding, encryption, authentication tag generation and insertion, and/or the NVMe PI insertion.

The reserved portion 256 may or may not be contiguous within the container 254. For example, as illustrated, the reserved portion 256 may be a block portion of the container 254. In instances in which the reserved portion 256 is used for NVMe PI insertion, segments of the reserved portion 256 may be distributed between portions of the compressed source data, such that the reserved portion 256 may not be contiguous and/or may be distributed within the container 254. For example, a first portion of compressed source data may be stored in the container 254, followed by a first NVMe PI insertion, then a second portion of the compressed data, followed by a second NVMe PI insertion, and so forth.

Modifications, additions, or omissions may be made to the compression operation 200 and the compression operation 250 without departing from the scope of the present disclosure. For example, the designations of different elements in the manner described is meant to help explain concepts described herein and is not limiting. Further, the compression operation 200 and the compression operation 250 may include any number of other elements or may be implemented within other systems or contexts than those described. For example, any of the components of FIGS. 2A and 2B may be divided into additional or combined into fewer components.

Figure 3:
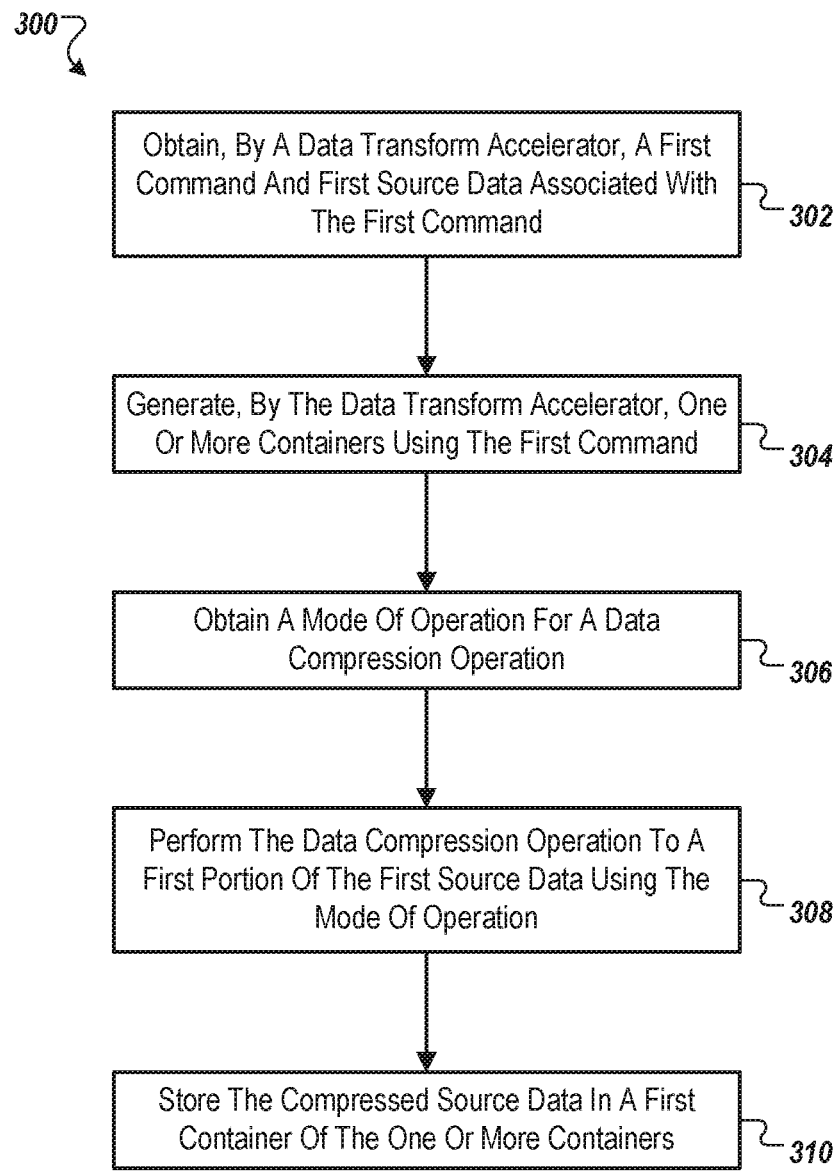
FIG. 3 illustrates a flowchart of an example method of data compression in a data transform accelerator.

FIG. 3 illustrates a flowchart of an example method 300 of data compression in a data transform accelerator, in accordance with at least one embodiment of the present disclosure. The method 300 may be performed by processing logic that may include hardware (circuitry, dedicated logic, etc.), software (such as is run on a general purpose computer system or a dedicated machine), or a combination of both, which processing logic may be included in any computer system or device such as the data transform accelerator 120 of FIG. 1.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification may be capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

At block 302, a first command and first source data associated with the first command may be obtained by a data transform accelerator.

At block 304, one or more containers may be generated by the data transform accelerator, using the first command. In some embodiments, each of the one or more containers may have a container size and may be operable to store compressed source data.

In some embodiments, the container size of the one or more containers may be uniform. The container size may be determined based on at least one of an operating system, a platform software, a storage architecture, a performance tuning, and/or a user input. The user input may include an estimate of a number of containers that may be used per command. The performance tuning may include a tuning a data compression parameter, where the data compression parameter may be tuned in view of at least one of a container size optimization, a data compression maximization, and/or a user input.

At block 306, a mode of operation for a data compression operation may be obtained. In some embodiments, the mode of operation may be stateless data compression. In instances in which a data decompression operation on the first container may be independent of the data decompression operation on a subsequent container.

At block 308, the data compression operation may be performed to a first portion of the first source data. In some embodiments, the data compression operation may use the mode of operation to obtain the compressed source data.

At block 310, the compressed source data may be stored in a first container of the one or more containers.

Modifications, additions, or omissions may be made to the method 300 without departing from the scope of the present disclosure. For example, in some embodiments, the container size associated with the one or more containers may be determined using metadata that may be included the first command. In another example, a portion of the first container may be reserved for an NVMe PI insertion.

In another example, a second command and second source data associated with the first command may be obtained. The first command and the second command may be included in a session. Alternatively, or additionally, the data compression operation may be performed to a second portion of the first source data and a first portion of the second source data using the mode of operation to obtain second compressed source data. Alternatively, or additionally, the second compressed source data may be stored in a second container of the one or more containers.

The second container may include one or more dependencies on the first container. The first container may include a frame header having compression parameters associated with the data compression operation, such that in response to a request to decompress the second container, the first container may first be decompressed and the frame header may be used to decompress the second container. The first command and/or the second command included in the session may share session parameters, which may include at least a compression algorithm.

In another example, a report associated with the first source data may be generated. The report may include an amount of the first source data consumed in the data compression operation. Alternatively, or additionally, the report may be transmitted to an external device associated with the first source data.

In another example, the designations of different elements in the manner described is meant to help explain concepts described herein and is not limiting. Further, the method 300 may include any number of other elements or may be implemented within other systems or contexts than those described.

Figure 4:
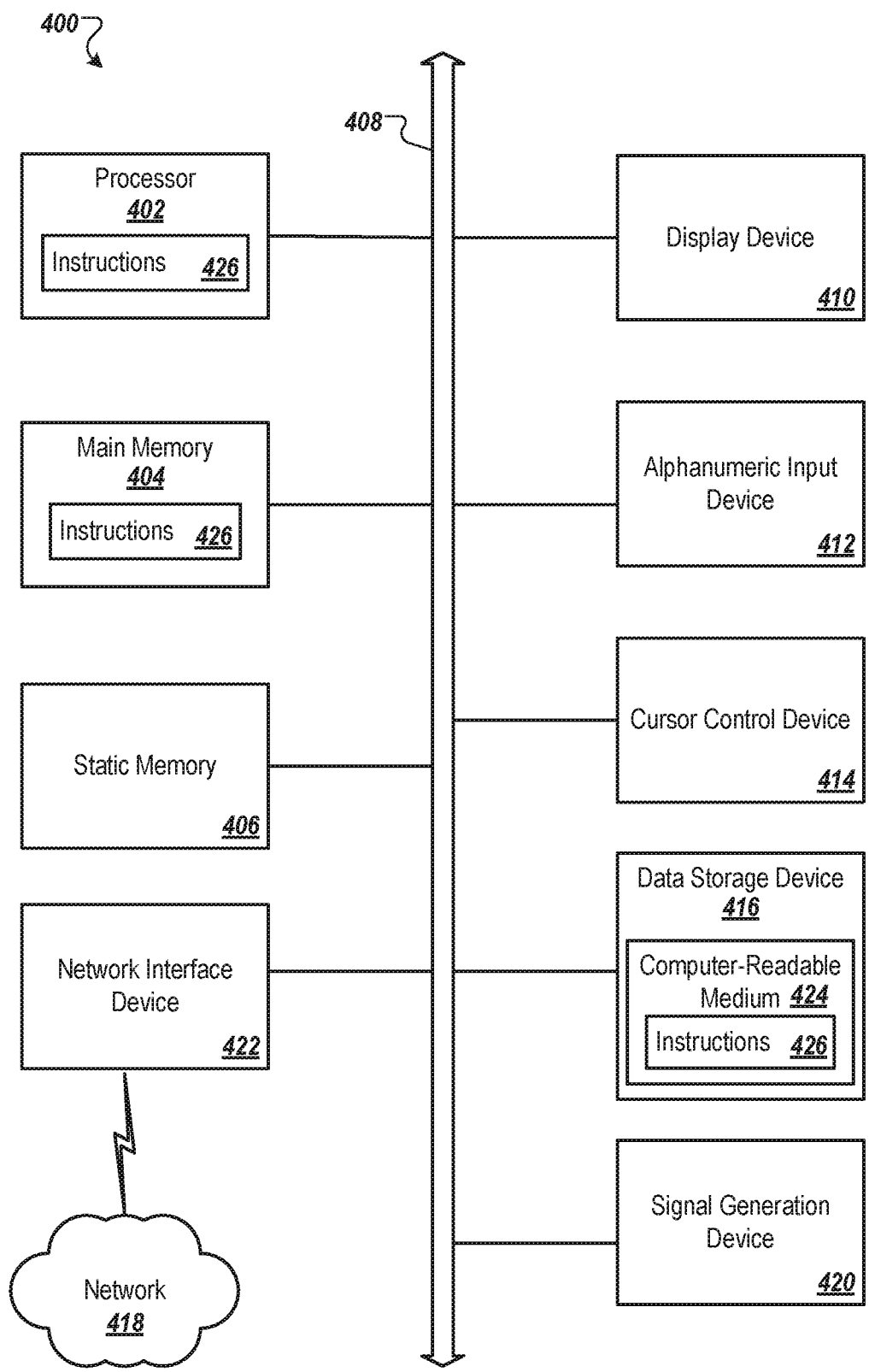
FIG. 4 illustrates an example computing device.

FIG. 4 illustrates an example computing device 400 within which a set of instructions, for causing the machine to perform any one or more of the methods discussed herein, may be executed. The computing device 400 may include a mobile phone, a smart phone, a netbook computer, a rackmount server, a router computer, a server computer, a personal computer, a mainframe computer, a laptop computer, a tablet computer, a desktop computer, or any computing device with at least one processor, etc., within which a set of instructions, for causing the machine to perform any one or more of the methods discussed herein, may be executed. In alternative implementations, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The computing device 400 includes a processing device 402 (e.g., a processor), a main memory 404 (e.g., read-only memory (ROM), flash memory, dynamic random access memory (DRAM) such as synchronous DRAM (SDRAM)), a static memory 406 (e.g., flash memory, static random access memory (SRAM)) and a data storage device 416, which communicate with each other via a bus 408.

The processing device 402 represents one or more general-purpose processing devices such as a microprocessor, central processing unit, or the like. More particularly, the processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also include one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computing device 400 may further include a network interface device 422 which may communicate with a network 418. The computing device 400 also may include a display device 410 (e.g., a liquid crystal display (LCD) or a cathode ray tube (CRT)), an alphanumeric input device 412 (e.g., a keyboard), a cursor control device 414 (e.g., a mouse) and a signal generation device 420 (e.g., a speaker). In at least one implementation, the display device 410, the alphanumeric input device 412, and the cursor control device 414 may be combined into a single component or device (e.g., an LCD touch screen).

The data storage device 416 may include a computer-readable storage medium 424 on which is stored one or more sets of instructions 426 embodying any one or more of the methods or functions described herein. The instructions 426 may also reside, completely or at least partially, within the main memory 404 and/or within the processing device 402 during execution thereof by the computing device 400, the main memory 404 and the processing device 402 also constituting computer-readable media. The instructions may further be transmitted or received over a network 418 via the network interface device 422.

While the computer-readable storage medium 424 is shown in an example implementation to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although implementations of the present disclosure have been described in detail, various changes, substitutions, and alterations could be made hereto without departing from the spirit and scope of the present disclosure.

What is claimed is:

1. A method, comprising:
    obtaining, by a data transform accelerator, a first command and first source data associated with the first command;
    generating, by the data transform accelerator, one or more containers using the first command, each of the one or more containers having a container size and are operable to store compressed source data;
    obtaining a mode of operation for a data compression operation;
    performing the data compression operation to a first portion of the first source data using the mode of operation to obtain the compressed source data; and
    storing the compressed source data in a first container of the one or more containers.

2. The method of claim 1, further comprising determining the container size associated with the one or more containers using metadata included the first command.

3. The method of claim 1, wherein the container size is determined based on at least one of an operating system, a platform software, a storage architecture, a performance tuning, and a user input.

4. The method of claim 3, wherein the user input comprises an estimate of a number of containers to be used per command.

5. The method of claim 3, wherein the performance tuning includes a tuning a data compression parameter, where the data compression parameter is tuned in view of at least one of a container size optimization, a data compression maximization, and a user input.

6. The method of claim 1, further comprising:
    obtaining a second command and second source data associated with the first command, the first command and the second command included in a session;
    performing the data compression operation to a second portion of the first source data and a first portion of the second source data using the mode of operation to obtain second compressed source data; and
    storing the second compressed source data in a second container of the one or more containers.

7. The method of claim 6, wherein the second container includes one or more dependencies on the first container and the first container includes a frame header comprising compression parameters associated with the data compression operation, such that in response to a request to decompress the second container, the first container is first decompressed and the frame header is used to decompress the second container.

8. The method of claim 6, wherein the first command and the second command included in the session one or more share session parameters, the session parameters comprising at least a compression algorithm.

9. The method of claim 1, wherein the container size of the one or more containers is uniform.

10. The method of claim 1, further comprising generating a report associated with the first source data, the report including an amount of the first source data consumed in the data compression operation.

11. The method of claim 10, further comprising transmitting the report to an external device associated with the first source data.

12. The method of claim 1, wherein the mode of operation is stateless data compression, and a data decompression operation on the first container may be independent of the data decompression operation on a subsequent container.

13. The method of claim 1, further comprising reserving a portion of the first container for a non-volatile memory express (NVMe) protection information (PI) insertion.

14. A data transform accelerator comprising:
    one or more data transform engines including at least a compression engine; and
    a processing device operable to:
        obtain a first command and first source data associated with the first command;
        generate one or more containers using the first command, each of the one or more containers having a container size and are operable to store compressed source data;
        obtain a mode of operation for a data compression operation;
        perform, using the compression engine, the data compression operation to a first portion of the first source data using the mode of operation to obtain the compressed source data; and
        store the compressed source data in a first container of the one or more containers.

15. The data transform accelerator of claim 14, wherein the container size of the one or more containers is uniform.

16. The data transform accelerator of claim 14, wherein the processing device is further operable to:
    obtain a second command and second source data associated with the first command, the first command and the second command included in a session;
    perform the data compression operation to a second portion of the first source data and a first portion of the second source data using the mode of operation to obtain second compressed source data; and
    store the second compressed source data in a second container of the one or more containers.

17. The data transform accelerator of claim 14, wherein the container size is determined based on at least one of an operating system, a platform software, a storage architecture, a performance tuning, and a user input.

18. The data transform accelerator of claim 17, wherein the performance tuning includes a tuning a data compression parameter, where tuning the data compression parameter is performed in view of at least one of a container size optimization, a data compression maximization, and a user input.

19. The data transform accelerator of claim 14, wherein:
    the compression engine is operable to a report associated with the first source data, the report including an amount of the first source data consumed in the data compression operation; and
    the processing device is operable to transmit the report to an external device associated with the first source data.

20. The data transform accelerator of claim 14, wherein the processing device is further operable to reserve a portion of the first container for subsequent transform operations including at least one of: padding, encryption, authentication tag generation, embedding, and NVMe PI insertion.

* * * * *